Patented July 5, 1949

2,475,364

UNITED STATES PATENT OFFICE 2,475,364

CATALYTIC HYDROLYSIS OF UNSATURATED HALIDES

Gerald H. van de Griendt, Belmont, Mass., and Leslie M. Peters, San Francisco, Calif., assignors to Shell Development Company, San Francisco, Calif., a corporation of Delaware No Drawing. Application December 21, 1943, Serial No. 515,194

19 Claims. (Cl. 260—640)

1

This invention relates to a process for producing unsaturated alcohols by catalytically hydrolyzing unsaturated halides in acid medium. More particularly, the invention pertains to a process whereby unsaturated alcohols are produced by contacting a member of a class of unsaturated halides with an acidic aqueous solution of a cuprous halide.

We have discovered that hydrolysis of the members of a class of unsaturated halides is catalyzed by cuprous halide in aqueous solution and that by bringing the unsaturated halides into contact with an acidic aqueous solution of the cuprous compound, hydrolysis of the halide to an unsaturated alcohol is effected. The discovery that the unsaturated halides can be hydrolyzed to unsaturated alcohols in an acid medium provides means for a particularly advantageous method of producing the valuable unsaturated alcohols. Methods heretofore known for producing unsaturated alcohols by hydrolyzing a beta,-gamma-olefinic halide have involved the use of inorganic bases. While these methods give good yields of the desired alcohol, the basic agent is consumed in the process and the halide salt obtained as an end-product is of relatively little value. Furthermore, the processes are economically practicable only when executed at high temperature which necessitates operation at high pressures since the hydrolysis is effected in the liquid phase with heavy and necessarily expensive apparatus or equipment. These disadvantages are overcome by the process of the present invention.

It is an object of the invention to provide a process for the manufacture of unsaturated alcohols from a class of unsaturated halides that does not necessitate the use or consumption of basic agents for effecting the hydrolysis. Another object is to provide a method of producing unsaturated alcohols by hydrolysis of certain unsaturated halides whereby the halide from the hydrolysis reaction is obtainable as a by-product of the process in the form of valuable hydrogen halide. Another object is to provide a process which is efficiently operative in producing unsaturated alcohols from unsaturated halides at atmospheric or only slightly elevated temperatures. These and other objects will be apparent from the description of the invention given hereinafter.

The hydrolysis in aqueous medium is catalyzed by cuprous halides for unsaturated halides which possess a particular and essential unit of structure. The unsaturated halides which are suitable for use in the process of the invention are compounds of the formula

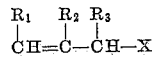

wherein $R_1$ is a hydrogen atom, a halogen atom, an alkyl group or an aryl group; $R_2$ is a hydrogen atom or a halogen atom; $R_3$ is a hydrogen atom, an alkyl group or an aryl group and X represents a halogen atom. The halogen atom or atoms contained in the unsaturated halide can be fluorine, chlorine, bromine or iodine and when a plurality are present in the compound they can be the same or different. Preferably the halogen atom or atoms present in the unsaturated halide are chlorine or bromine, the former being most preferred. The alkyl group can be such groups as methyl, ethyl, propyl, isopropyl, isobutyl, secondary butyl, tertiary butyl, pentyl, hexyl, octyl, decyl, dodecyl, octadecyl, etc. The aryl group can be such groups as phenyl, tolyl, xylyl, ethyl phenyl, naphthyl, tertiary butyl phenyl, dimethyl phenyl, methyl naphthyl, allyl phenyl, butenyl phenyl, etc. A preferred subclass of the unsaturated halides are contained in the 1-halo-2-alkenes containing not more than 10 carbon atoms and having a straight or unbranched carbon chain.

The hydrolysis reaction is effected by bringing the unsaturated halide into contact with an acidic aqueous solution of a cuprous halide. The unsaturated halides are not appreciably soluble in the catalyst solution and it is therefore desirable that the reactant be brought into intimate contact with the solution. Contacting of the unsaturated halide with the catalyst solution can be accomplished with the unsaturated halide in the liquid phase or with vapors of the reactant. Intimate contact of the unsaturated halide with the catalyst solution is effected in any conventional manner such as stirring the unsaturated halide with the catalyst solution, bubbling the unsaturated halide into the catalyst solution, passing liquid or vaporous unsaturated halide countercurrent to the catalyst solution in a vessel containing packing materials designed to give intimate contact of separate phases, passing mixtures of reactant and catalyst solution through tubes under conditions conducive to promoting turbulent flow and similar operative means for contacting the unsaturated halide with the catalyst solution.

The acidic aqueous solution of the cuprous halide serves several purposes in the process. The aqueous solution provides the carrier or medium for the cuprous ion or a complex thereof which is the catalyst for the hydrolysis reaction. It also supplies the necessary water for the hydrolysis reaction. The hydrogen halide formed by the hydrolysis reaction dissolves in the catalyst solution and the solution thus provides the means for accumulating and disposing of the hydrogen halide. In the case where an allyl halide is hydrolyzed and an allyl alcohol is produced, the allyl alcohol as formed dissolves in the catalyst solution owing to the complete miscibility of allyl alcohol with water. With unsaturated alcohols of increasing molecular weight obtained from higher unsaturated halides, the distribution of the product tends towards the organic phase because of lesser solubility of the higher alcohols in water.

The acidic aqueous solution contains any cuprous halide dissolved therein which is desired. Ordinarily, cuprous chloride is the most preferred salt. This cuprous compound is readily available or is easily prepared by bringing an aqueous solution of cupric chloride, preferably heated, into contact with metallic copper. Complex cuprous compounds are also suitable such as, for example, chloro cuprous acid. It appears that the activity of the catalyst solution is due to the presence therein of cuprous ion or a complex thereof, such as chloro cuprous ion which is present when the solution contains a stoichiometric excess of chloride ion in relation to the amount of cuprous copper therein.

The concentration of the cuprous compound in the catalyst solution may be varied over a wide range. In general, with other factors constant, increasing concentrations of cuprous halides in solution have the effect of increasing the reaction rate. However, the solubility of cuprous halide in water is comparatively small which fact appears to place an upper limit on the concentration which may be efficiently utilized. This upper limit of concentration is not, however, entirely dependent upon the solubility of the cuprous compounds in water. The formation of complex cuprous ions may permit a considerable increase in concentration. Thus halide ions, either resulting from the hydrolysis reaction or introduced into the catalyst solution from an external source, may be used to increase the solubility by formation of complex ions. It has been found, nevertheless, that satisfactory and practicable reaction rates may be obtained with quite low concentrations of catalyst owing to its high activity. Excellent results are obtainable with cuprous ion or a complex thereof at concentrations of the order of 0.1 to 0.01 normal or even less of cuprous ion.

The catalyst solution of a cuprous halide is so active that the hydrolysis reaction is catalyzed at ordinary room temperature (20° C.). It is usually preferable, however, to employ elevated temperatures because of the better results obtainable thereby. Temperatures of 50° C. to 250° C. are suitable. A preferred range is from about 75° C. up to 125° C. By employing temperatures in the preferred range, the process may be operated without the use of superatmospheric pressures or only slightly elevated pressures which makes it more desirable than prior methods of preparing the unsaturated alcohols. If desired, of course, the higher temperatures with superatmospheric pressures can be used.

After contacting the unsaturated halide with the catalyst solution, it is usually desirable to remove the resulting alcohol from the reaction mixture. This may be done without destroying the cuprous compound in the catalyst solution by distilling the alcohol therefrom per se or by stripping the alcohol out with steam or other methods such as extraction, precipitation and the like. However, besides catalyzing the hydrolysis reaction, the cuprous compounds also catalyze the formation of ethers which substances are usually considered to be undesirable by-products. The formation of ethers in the process may be minimized by keeping the concentration of the desired alcohol in the reaction mixture as low as possible and by subjecting the mixture to treatment for removal of the alcohol as soon as possible. These conditions which are conducive to obtaining the best results are best met by operating the process in a continuous fashion although batchwise or intermittent operation can be used, if desired. While a most preferred mode of continuous operation will be described wherein allyl chloride is employed as the reactant, it is apparent that many variations of the method would be obvious to those skilled in the art to meet requirements of particular properties of other reactants, various circumstances of application of the method and the like without departing from the spirit of our invention.

The reaction is effected in a vessel comprising a tower filled with suitable packing material for obtaining good intermingling of two phases such as beads, baffles, rings, etc. The catalyst solution can consist of an aqueous solution of cuprous chloride acidified with an acid which is preferably hydrochloric acid, but can be other acids such as sulfuric acid, phosphoric acid, etc. It is preferable that the catalyst solution contain as acidic component thereof, a hydrogen halide and it is most preferable that it be the hydrogen halide formed by the hydrolysis of the unsaturated halide. For the purpose of increasing the solubility of the cuprous chloride by formation of complex cuprous ions, the catalyst solution can also contain halide salts dissolved therein. Suitable salts include sodium chloride, sodium bromide, ammonium chloride, calcium chloride, potassium chloride and the like. The catalyst solution is heated and is continuously introduced into the top of the tower. The tower is maintained nearly full of solution, say three-quarters full, with a liquid level at this point. Heated vapors of allyl chloride are introduced into the bottom of the tower, rise in the form of bubbles and come into intimate contact with the catalyst solution. The rate of introduction of the allyl chloride is regulated so that none or only a minor portion of the vapors of allyl chloride pass above the liquid level into the upper part of the tower. The allyl alcohol which results from the hydrolysis dissolves in the catalyst solution as does also the hydrogen chloride which is formed. The catalyst solution containing the allyl alcohol is continuously withdrawn from the bottom of the column. The rate of withdrawal is adjusted with the rate of introduction of catalyst solution so that the liquid level in the column is maintained substantially fixed. The flows are preferably regulated so that the concentration of allyl alcohol in the withdrawn solution is not greater than 5 to 6 percent because of excessive ether formation at higher concentrations. With allyl chloride, the preferred temperature of operation is at about 80° C. The catalyst solution may be maintained at this temperature by an external heating bath surrounding the tower, by steam coils within the tower or by other suitable means. At this temperature, unreacted allyl chloride and some water together with diallyl ether, a small amount of alcohol and a trace of propionaldehyde, a by-product, vaporize overhead from the tower and are condensed after leaving it.

The solution withdrawn from the reaction tower requires the removal of the allyl alcohol therein. While the alcohol may be removed from this acid solution which contains the catalyst by distillation, it is preferable to strip the alcohol out with steam. This may be done by passing the solution to a fractionating column into which is fed live steam. The alcohol is carried overhead from the column with steam and may be condensed and collected. This alcohol is in solution with considerable water, but is free of the catalyst and the alcohol may be recovered from it by distillation. The bottom product from the column is an aqueous solution containing the catalyst and auxiliary salts, if used, and most of the hydrochloric acid. It is evident that the use of steam in such a manner tends to further dilute the reaction products and a better method of stripping the alcohol which does not require the use of external live steam is more preferable.

According to this method, the solution from the reaction tower is fed to a fractionating column fitted with a reboiler or kettle for supplying heat. In the column, steam from the solution is generated at the base of the column by the reboiler and passes up the column stripping the alcohol from the descending solution which may be introduced about half-way up. By proper operation of the column, the solution withdrawn at the base will be substantially free of alcohol and the overhead product will be free of catalyst and contain only a minor amount of hydrochloric acid. Also, such an operation tends to concentrate both products. Thus, for example, if the column is operated so that about half of the water in the solution from the reaction tower passes overhead in stripping the alcohol from the solution, it is evident that the overhead product will contain about twice the concentration of allyl alcohol as in the feed to the column and the bottom product will contain twice the concentration of hydrochloric acid as in the feed. If the original catalyst solution is a cuprous chloride solution containing hydrochloric acid, this may be supplied from a part of the bottom product of the stripping operation which may be diluted with water to the desired acid strength, refortified with cuprous chloride to desired concentration and recycled to the reaction tower. The remaining hydrochloric acid end-product is a useful substance for other syntheses and operations.

The foregoing process of the invention has been described in detail with special reference to conditions which are conducive to the production of alcohol from the unsaturated halide. The unsaturated diether is obtained in greater or lesser amounts as a by-product of the process. Ordinarily, the ether is an undesired by-product and it is preferable to keep its formation at a minimum. This is attained by keeping the concentration of alcohol present in the reaction mixture as low as feasible since the ether is formed by reaction of the unsaturated halide with the formed alcohol in the presence of the catalyst solution. The formed alcohol will be present predominantly in the aqueous catalyst solution in the case where allyl alcohol is produced or will be predominantly present in the organic phase in the case where higher unsaturated alcohols are obtained. Intermediate alcohols will be distributed between the organic and aqueous phase; by separating the formed alcohol of the reaction mixture substantially as soon as formed the formation of ether by the side reaction is suppressed. This is accomplished by substantially immediately distilling the unsaturated alcohol from the reaction mixture. Another excellent method is to strip the alcohol from the reaction mixture with steam as soon as it is formed.

If desired, the process may be executed in such a manner that ether is the principal product. For example, the contacting of allyl chloride with an aqueous solution of a cuprous compound which contains a large concentration of allyl alcohol will permit diallyl ether to be produced. The method may be made continuous by distilling the ether from the reaction mixture as the ternary azeotrope with alcohol and water and recycling the alcohol to the reaction mixture after removal from the distillate whereby diallyl ether is obtained as the primary product of the process.

Some of the unsaturated halides and/or their corresponding alcohols are subject to allylic rearrangement under the conditions of the process of the invention. Crotyl chloride can undergo rearrangement to 2-chloro-2-butene and likewise crotyl alcohol is capable of rearranging to 2-chloro-2-butanol. Both of these reactions involve allylic rearrangement and both are equilibrium reactions. Under the conditions of the process, appreciable amounts of each compound can be present even though only a single unsaturated halide is employed as the starting reactant. The product in this event can be a mixture of the isomeric alcohols unless precautions are taken to minimize the formation or to promote the complete conversion to a single isomeric product. Such precautions would be, for example, to recover the unsaturated alcohol by distilling under conditions known to the art as suitable for obtaining a single compound.

For the purpose of illustrating the invention more clearly, the following examples are given although these are not to be construed as limitative either in details or modes of execution of the process of the invention:

*Example I*

About 712 gms. of 5% by weight of aqueous hydrochloric acid solution, 92 gms. of allyl chloride, 1 gm. of cuprous chloride and 1 gm. of metallic copper were added to a flask fitted with a mechanical stirring device and a reflux condenser, the flask and fittings being such that no metal came in contact with the contents thereof. The materials were stirred and heated at an average temperature of 42° C. for one hour. To avoid the presence of cupric ion the metallic copper was used in the reaction mixture and the contents of the flask were maintained under an atmosphere of nitrogen. The reaction mixture was cooled after the treating period and 792 gms. of aqueous solution were recovered. The following materials were obtained by distillation. 15 gms. of allyl chloride, 34 gms. of allyl alcohol and 10 gms. of diallyl ether. The allyl alcohol recovered showed that 49% of the allyl chloride was converted to allyl alcohol by the treatment.

*Example II*

Cupric ion is inactive in catalyzing the hydrolysis reaction of the beta, gamma-olefinic halides.

This was demonstrated by the following experiment:

About 699 gms. of water, 92 gms. of allyl chloride and 1 gm. of cupric chloride were placed in the same apparatus described in Example I. The materials were stirred and heated at an average temperature of 43° C. for one hour. During the entire treating period a slow stream of air was bubbled through the contents of the flask in order to maintain the copper therein in its highest state of valency, the cupric state. Upon completion of the treating period 701 gms. of aqueous solution were separated from the organic allyl chloride phase. Allyl chloride is substantially insoluble in aqueous solutions while allyl alcohol is completely miscible with water. The separated aqueous solution contained no detectable amount of allyl alcohol.

Besides showing that cupric ion is catalytically inactive to effect the hydrolysis reaction, the above described experiment indicated that the hydrolysis reaction of the unsaturated halides in the presence of water alone is immeasurably slow as compared with the reaction in the presence of an acidic aqueous solution of a cuprous compound. The conditions in this example were substantially identical with those of Example I except that in this experiment the aqueous solution contained only water and the inactive salt, cupric chloride, while in Example I an acidic aqueous solution containing cuprous ion and/or a complex thereof, was employed.

*Example III*

A tower reactor consisting of 200 cm. of 4 cm. glass tubing which was jacketed and packed with 0.5 to 1.0 cm. lengths of 0.7 cm. glass tubing was used as the reaction vessel. This tower was fitted with external electrical resistance heaters to supply the necessary heat to keep the tower at about 80° C. The tower was maintained with a liquid level of catalyst solution at about 160 cm. from the bottom. The aqueous catalyst solution containing approximately 0.20% cuprous chloride and 2.75% hydrochloric acid was preheated and fed continuously into the top of the tower. Allyl chloride was vaporized and introduced continuously into the base of the tower. About 22% of the allyl chloride remained unreacted and passed overhead from the tower. The solution withdrawn continuously from the bottom of the tower contained about 3.80% allyl alcohol and 5.36% hydrochloric acid. This solution was preheated to about 90° C. to 95° C. and fed to the stripper. The stripper was a packed column fitted with an externally heated kettle. The overhead product from the stripper consisted of an aqueous solution containing about 7.25% allyl alcohol and 0.04% hydrogen chloride. The bottom product from the stripper contained about 10.3% hydrochloric acid. A material balance on the system showed that 22% of the allyl chloride was unreacted, 7.3% was converted to diallyl ether and 66.0% was hydrolyzed to allyl alcohol. The yield of allyl alcohol, therefore, amounted to 84.6%.

The foregoing examples have illustrated the process of the invention with respect particularly to hydrolysis of allyl chloride. In a similar manner other unsaturated halides of the class with which the invention is concerned, are hydrolyzed to unsaturated alcohols in the presence of an acidic aqueous solution of a cuprous halide. Besides the allyl halides like allyl fluoride, allyl chloride, allyl bromide, allyl iodide, other representative examples of the unsaturated halides which are similarly hydrolyzed by the method of the invention are preferred compounds such as, crotyl chloride, crotyl bromide, 1-chloro-2-pentene, 1-iodo-2-pentene, 1-chloro-2-hexene, 1-fluoro-2-hexene, 1-chloro-2-pentene, 1-bromo-2-nonene, 1-chloro-2-decene, as well as less preferred compounds such as 1,3-dichloropropene, 1-chloro-3-bromo-2-propene, 1,2-dichloro-2-propene, 2-chloro-3-butene, 2-bromo-3-pentene, 3-chloro-1-pentene, 4-bromo-2-hexene, cinnamyl chloride, 1-chloro-1-phenyl-2-propene, 3-chloro-4-methyl-1-pentene, 2-chloro-5,5-dimethyl-3-hexene, 1-chloro-3-tolyl-2-propene, 2-chloro-1-phenyl-3-butene, 1-chloro-4-phenyl-2-butene, 3-bromo-4,4-dimethyl-1-pentene, and the like.

This application is a continuation-in-part of our copending application, Serial No. 340,990, filed June 17, 1940, and now abandoned.

We claim as our invention:

1. A process for producing an unsaturated alcohol and a hydrogen halide which comprises hydrolyzing an unsaturated halide of the formula $$\underset{\mathrm{CH}=\mathrm{C}-\mathrm{CR}-X}{\overset{R_1\ \ R_2\ \ R_3}{|\ \ \ |\ \ \ |}}$$

wherein $R_1$ is a member of the group consisting of a hydrogen atom, a halogen atom, an alkyl group and an aryl group, $R_2$ is a member of the group consisting of a hydrogen atom and a halogen atom, $R_3$ is a member of the group consisting of a hydrogen atom, an alkyl group and an aryl group, and $X$ represents a halogen atom, said hydrolysis being effected by contacting said unsaturated halide with an acidic aqueous solution of a cuprous halide.

2. A process for the production of an unsaturated alcohol and a hydrogen halide from an unsaturated halide of the formula $$\underset{\mathrm{CH}=\mathrm{CH}-\mathrm{CH}-X}{\overset{R_1\ \ \ \ R_2}{|\ \ \ \ \ \ |}}$$

wherein $R_1$ and $R_2$ are each an alkyl group and $X$ represents a halogen atom, which comprises hydrolyzing said unsaturated halide with an acidic aqueous solution of cuprous chloride at a temperature of 50° C. to 250° C.

3. A process for the production of an unsaturated alcohol and a hydrogen halide from an unsaturated halide of the formula $$\underset{\mathrm{CH}=\mathrm{CH}-\mathrm{CH}-X}{\overset{R_1\ \ \ \ R_2}{|\ \ \ \ \ \ |}}$$

wherein $R_1$ and $R_2$ are each an alkyl group and $X$ represents a halogen atom which comprises intimately contacting said unsaturated halide with an acidic aqueous solution of a cuprous halide.

4. A process for the production of an unsaturated alcohol and a hydrogen halide which comprises contacting a crotyl halide with an acidic aqueous solution of a cuprous halide.

5. A process for the production of an unsaturated alcohol and hydrogen chloride which comprises effecting the hydrolysis of crotyl chloride in the presence of an acidic aqueous solution of cuprous chloride, said solution being acidic by the presence therein of hydrochloric acid.

6. A process for the production of an unsaturated alcohol and hydrogen chloride which comprises hydrolyzing crotyl chloride to an unsaturated alcohol with an acidic aqueous solution of cuprous chloride, and stripping the unsaturated alcohol from the reaction mixture with steam.

7. A process for the production of an unsaturated alcohol and hydrogen chloride which comprises converting crotyl chloride to a saturated alcohol by contacting said crotyl chloride with a heated acidic aqueous solution of cuprous chloride, and substantially immediately distilling the formed unsaturated alcohol from the reaction mixture.

8. A process for the production of an unsaturated alcohol and a hydrogen halide which comprises hydrolyzing a crotyl halide to an unsaturated alcohol by contacting vapors of the crotyl halide with an acidic aqueous solution of cuprous chloride, and substantially immediately distilling the formed unsaturated alcohol from the reaction mixture.

9. A process for the production of an unsaturated alcohol and a hydrogen halide which comprises contacting a 3-halo-1-butene with an acidic aqueous solution of a cuprous compound.

10. A process for the production of an unsaturated alcohol and hydrogen chloride which comprises effecting the hydrolysis of 3-chloro-1-butene in the presence of an acidic aqueous solution of cuprous chloride, said solution being an acidic by the presence therein of hydrochloric acid.

11. A process for the production of an unsaturated alcohol and hydrogen chloride which comprises hydrolyzing 3-chloro-1-butene to an unsaturated alcohol with an acidic aqueous solution of cuprous chloride, and stripping the unsaturated alcohol from the reaction mixture with steam.

12. A process for the production of an unsaturated alcohol and hydrogen chloride which comprises converting 3-chloro-1-butene to an unsaturated alcohol by contacting said 3-chloro-1-butene with a heated acidic aqueous solution of a cuprous chloride, and substantially immediately distilling the formed unsaturated alcohol from the reaction mixture.

13. A process for the production of an unsaturated alcohol and a hydrogen halide which comprises hydrolyzing a 3-halo-1-butene with an acidic aqueous solution of cuprous chloride, and substantially immediately distilling the formed unsaturated alcohol from the reaction mixture.

14. In a process for the production of allyl alcohol and hydrogen chloride wherein allyl chloride is hydrolyzed to allyl alcohol, the step which comprises effecting the hydrolysis of allyl chloride in the presence of an acidic aqueous solution of cuprous chloride, said solution being acidic by the presence therein of hydrochloric acid.

15. A process for the production of allyl alcohol and hydrogen chloride which comprises hydrolyzing allyl chloride to allyl alcohol with an acidic aqueous solution of cuprous chloride, and stripping the allyl alcohol from the reaction mixture with steam.

16. A process for the production of allyl alcohol and hydrogen chloride which comprises converting allyl chloride to allyl alcohol by contacting said allyl chloride with a heated acidic aqueous solution of cuprous chloride, and substantially immediately distilling the formed allyl alcohol from the reaction mixture.

17. A process for the production of allyl alcohol and a hydrogen halide which comprises hydrolyzing an allyl halide to allyl alcohol by contacting vapors of the allyl halide with an acidic aqueous solution of cuprous chloride, and substantially immediately distilling the formed allyl alcohol from the reaction mixture.

18. In a process wherein an unsaturated halide is hydrolyzed to the corresponding alcohol and hydrogen halide, said unsaturated halide being of the formula

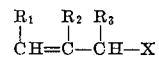

wherein $R_1$ is a member of the group consisting of a hydrogen atom, a halogen atom, an alkyl group and an aryl group, $R_2$ is a member of the group consisting of a hydrogen atom and a halogen atom, $R_3$ is a member of the group consisting of a hydrogen atom, an alkyl group and an aryl group, and X represents a halogen atom, the operation which comprises contacting said unsaturated halide with an aqueous solution of a cuprous halide, which solution is acidic with hydrogen halide contained therein from the hydrolysis reaction.

19. In a process wherein an unsaturated halide is hydrolyzed to the corresponding alcohol and hydrogen halide, said unsaturated halide being of the formula

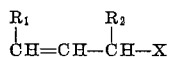

wherein $R_1$ and $R_2$ are each an alkyl group and X represents a halogen atom, the operation which comprises contacting said unsaturated halide with an aqueous solution of cuprous chloride at a temperature of 150° C. to 250° C., the solution being acidic with hydrogen halide contained therein from the hydrolysis reaction.

GERALD H. van de' GRIENDT.
LESLIE M. PETERS.

REFERENCES CITED

The following references are of record in the file of this patent:

UNITED STATES PATENTS

| Number    | Name         | Date           |
|-----------|--------------|----------------|
| 1,237,076 | Matter       | Aug. 14, 1917  |
| 1,806,798 | Hale et al.  | May 26, 1931   |
| 1,849,844 | Lloyd        | Mar. 15, 1932  |
| 1,882,824 | Hale et al.  | Oct. 18, 1932  |
| 1,884,710 | Jenkins et al. | Oct. 25, 1932 |
| 2,072,015 | Tamele et al. | Feb. 23, 1937 |
| 2,072,016 | Tamele et al. | Feb. 23, 1937 |
| 2,138,609 | Meyer        | Nov. 29, 1938  |
| 2,176,055 | Britton et al. | Oct. 17, 1939 |
| 2,323,781 | Kohler       | July 6, 1943   |

FOREIGN PATENTS

| Number  | Country       | Date           |
|---------|---------------|----------------|
| 549,001 | Great Britain | Nov. 2, 1942   |
| 413,447 | Germany       | May 11, 1925   |
| 421,789 | Germany       | Nov. 17, 1925  |

OTHER REFERENCES

Doughty: "Jour. Am. Chem. Soc.," vol. 39, pp. 2685-92 (1917).

Tamele et al.: "Ind. and Eng. Chem." vol. 33, pp. 115-120 (1941).

Wilham et al.: Chemical and Metallurgical Engineering, vol. 47, pp. 834-838 (1940).

Disclaimer 2,475,364.—*Gerald H. van de Griendt*, Belmont, Mass., and *Leslie M. Peters*, San Francisco, Calif. CATALYTIC HYDROLYSIS OF UNSATURATED HALIDES. Patent dated July 5, 1949. Disclaimer filed Oct. 25, 1949, by the assignee, *Shell Development Company*.

Hereby enters this disclaimer to so much of claim 7 of said Letters Patent as is in excess of the following:

"A process for the production of an unsaturated alcohol and hydrogen chloride which comprises contacting crotyl chloride with a heated acidic aqueous solution of cuprous chloride, and substantially immediately distilling the formed unsaturated alcohol from the reaction mixture."

[*Official Gazette December 6, 1949.*]